UNITED STATES PATENT OFFICE.

CARL FRIEDERICH PAULS, OF CHICAGO, ILLINOIS.

ENAMELING.

SPECIFICATION forming part of Letters Patent No. 467,356, dated January 19, 1892.

Application filed June 18, 1891. Serial No. 396,744. (No specimens.)

*To all whom it may concern:*

Be it known that I, CARL FRIEDERICH PAULS, a citizen of the United States, residing at Chicago, in the county of Cook and State of Illinois, have invented certain new and useful Improvements in Enameling; and I do hereby declare the following to be a full, clear, and exact description of the invention, such as will enable others skilled in the art to which it appertains to make and use the same.

One of my objects is to produce an enamel which will not, after its application to a surface, "craze" or crack.

Another object of my invention is to produce an enamel which, when not specially impregnated with coloring-pigments, shall be a pure white. It is well known in the art that it is extremely difficult to attain both these ends, and that large quantities of enameled manufactures are marketed in which the enamel, if uncolored, is not a pure white and is crazed or cracked.

In the preparation of my improved enamel I first place about twenty-five pounds of lead into a vessel and calcine the same. When this has been accomplished, I add eight pounds of tin to the calcined lead and calcine the tin in the presence of the calcined lead, thoroughly mixing the two metals. The calcining of the tin is deferred until the lead has been calcined, because the heat required for calcining the lead would be sufficient to burn the tin, and the heat required for calcining the tin is so small, relatively, that the calcining of the tin may be accomplished in the presence of the calcined lead without injury to the latter. After the mixture of calcined lead and tin has cooled, I add thereto two pounds of porcelain of good quality, twenty pounds of common salt, eight ounces of white arsenic, and silicious materials consisting of one pound of glass and twenty pounds of white sand, or five pounds of glass and ten pounds of flint. All the ingredients above mentioned are then thoroughly mixed and the mixture divided and placed into clay vessels containing about five pounds each. Said vessels are then set into a furnace and heated from four to six days until the ingredients are thoroughly melted into a homogeneous mass. The blocks resulting from the foregoing are then crushed and ground in water to sufficient fineness to be carried by the water into a settling-vessel, in which the material is allowed to precipitate. After the material has entirely precipitated to the bottom of the settling-vessel, water is poured from the top of said vessel until only sufficient water is left for making a mixture of sufficient thickness to spread on the surface to be glazed after the mixture has been stirred. Then I add about one quart of muriatic acid and stir with the mixture previously made, and then leave the resulting mixture stand for about twenty-four hours. Then more water is added to the mixture and thoroughly mingled therewith and the resulting mixture allowed to settle and all the liquid above the precipitated solids poured off. Then clean water is again added in the same manner and the solid portions of the mixture allowed to settle and the liquids above the precipitated mixture again poured off. This process is repeated perhaps a dozen times, until the salt and the acid, and the matter with which the acid has combined, have all been floated or washed out of the mixture. The mixture now constitutes the enamel, and is ready for application in the usual manner to the surfaces to be enameled. I prefer, however, to add to the mixture, before its application to the surfaces to be enameled, about two quarts of a product obtained by combining wheat-flour and hot water and passing the mixture resulting from the combination of said wheat-flour and hot water through a fine sieve. This flour preparation constitutes non-colored albuminous paste, which imparts to the enamel sufficient adhesiveness to cause it to adhere well to the surfaces to be enameled until the goods have been placed in the kiln for burning. Any albumen free from coloring-matter would answer for this purpose. Beef blood has heretofore been used, but the coloring-matter in such blood has detracted from the whiteness of the finished work.

I claim as my invention—

1. A composition of matter to be used in enameling, which composition is composed of calcined lead and tin, and porcelain, common salt, white arsenic, and silicious materials, in substantially the proportions herein set forth.

2. A composition of matter to be used in enameling, which composition is composed of calcined lead and tin, and porcelain, common salt, white arsenic, and one pound of glass and twenty pounds of white sand, in substantially the proportions herein set forth.

3. An enamel composed of calcined lead and tin, and porcelain, common salt, white arsenic, silicious materials, and a non-colored albuminous paste, in substantially the proportions herein set forth.

4. An enamel composed of calcined lead and tin, and porcelain, common salt, white arsenic, one pound of glass and twenty pounds of white sand, and a non-colored albuminous paste, in substantially the proportions herein set forth.

5. The herein-described method of enameling with lead, tin, porcelain, common salt, white arsenic, and silicious materials, which method consists in first calcining the lead and tin, then combining the calcined lead and tin with the porcelain, common salt, white arsenic, and silicious materials in vessels and heating the same from four to six days until all the ingredients are melted into a homogeneous mass, then grinding such homogeneous mass, then treating the ground product with acid and water, and then adding a non-colored albuminous paste, substantially as described.

In testimony whereof I affix my signature in presence of two witnesses this 16th day of June, 1891.

CARL FRIEDERICH PAULS.

Witnesses:
CYRUS KEHR,
AMBROSE RISDON.